United States Patent [19]

O'Neill

[11] Patent Number: 4,594,023

[45] Date of Patent: Jun. 10, 1986

[54] BREAKWATER CONSTRUCTION ELEMENT

[76] Inventor: Raymond J. O'Neill, 3 Garmony Pl., Yonkers, N.Y. 10710

[21] Appl. No.: 659,676

[22] Filed: Oct. 11, 1984

[51] Int. Cl.⁴ .............................................. E02B 3/06
[52] U.S. Cl. ...................................... 405/29; 52/608; 405/33
[58] Field of Search ...................... 405/16, 21, 25, 29, 405/30, 33, 34, 35; 52/596, 603, 604, 606, 608, 609

[56] References Cited

U.S. PATENT DOCUMENTS

| | | |
|---|---|---|
| 472,590 | 4/1892 | Simpson . |
| 2,766,592 | 10/1956 | Danel . |
| 2,909,037 | 10/1959 | Palmer . |
| 3,176,468 | 4/1965 | Nagai . |
| 3,368,357 | 2/1968 | Takamori ........................... 405/29 |
| 3,614,446 | 10/1971 | Leuthold ............................. 52/608 |
| 3,636,713 | 1/1972 | O'Neill . |
| 3,759,043 | 9/1973 | Tokunaga ........................... 405/30 |
| 4,269,537 | 5/1981 | O'Neill ............................... 405/29 |
| 4,341,489 | 7/1982 | Karnas ............................... 405/35 |
| 4,347,017 | 8/1982 | Chevallier ......................... 405/29 |

FOREIGN PATENT DOCUMENTS 2120256 11/1972 Fed. Rep. of Germany .
851670 1/1940 France .

Primary Examiner—David H. Corbin
Attorney, Agent, or Firm—William L. Botjer

[57] ABSTRACT

A construction element for forming breakwaters. The element includes a massive inner core that is trapezoidal in configuration with the longest base of the trapezoid disposed downwardly. The inner core is supported by four legs. The legs extend above the upper surface, below the lower surface and beyond the outer periphery of the inner core so that the core will be spaced apart from any surface on which it rests, regardless of which face of the construction element is disposed downwardly. The longitudinal cross section of the legs is also trapezoidal with the longest base downward so as to enhance stability. Construction elements may be arranged in either patterned or random array to form breakwaters.

7 Claims, 9 Drawing Figures

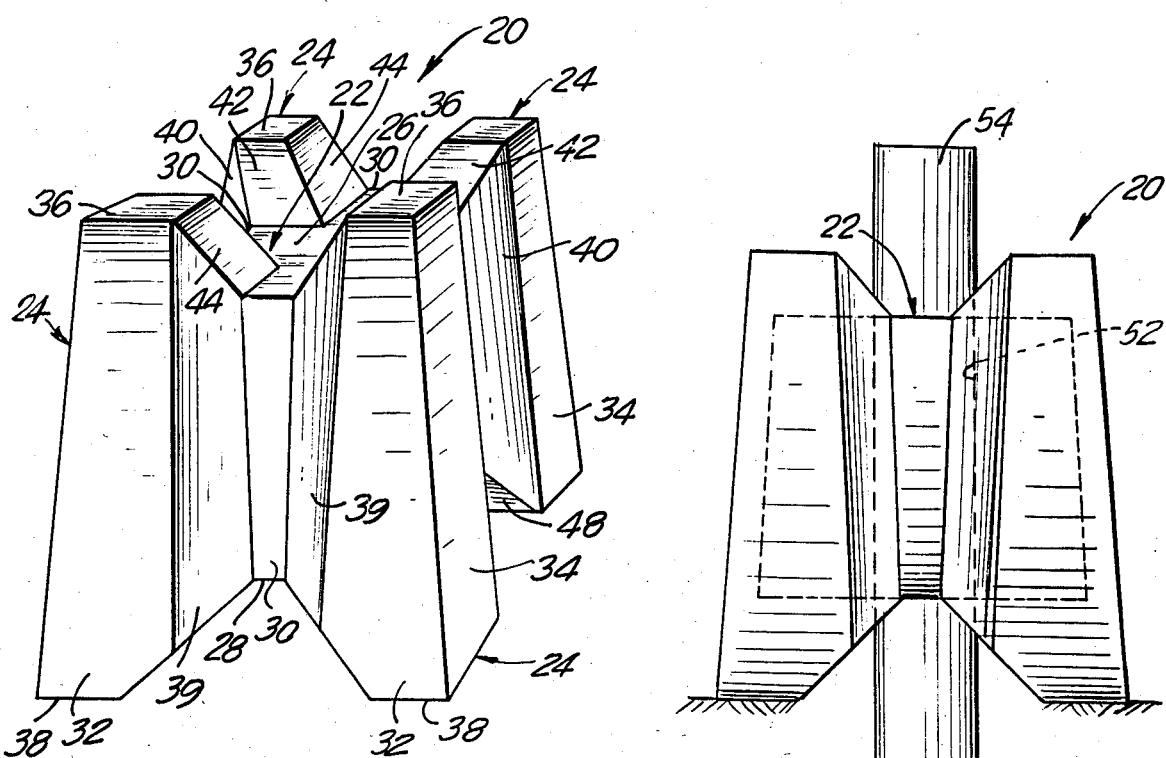
FIG. 1
FIG. 5
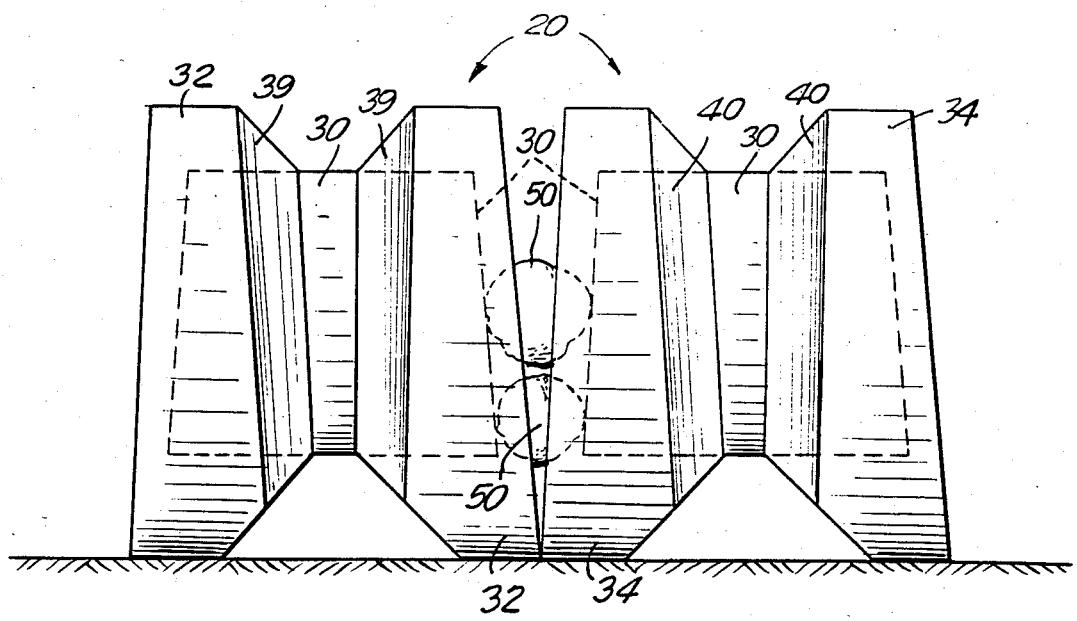
FIG. 4

BREAKWATER CONSTRUCTION ELEMENT

BACKGROUND AND SUMMARY OF THE INVENTION

This invention relates to a new and improved concrete armor shape for use in the design and construction of breakwaters, flood control structures, armored revetments, jetties and for the rapid building of off-shore islands. Since the early 1950's concrete armor shapes have been developed and have been used throughout the world with varying degrees of success. However, recently several major breakwaters have failed due to the lack of structural integrity of some of the armor units utilized in the building of the breakwaters. The present invention is of rugged design and provides special operational attributes not found in other concrete armor shapes.

The building of a major breakwater is an extremely costly venture that usually takes years to design and build. When erected in deep water areas, which can generate large waves, the breakwater is generally armored with large concrete armor units because of their superior stability factor over stone when subjected to severe wave attack. One of the major drawbacks in the use of concrete armor shapes for protection of marine structures is the high cost of producing the units which are usually cast only once every 24 hours. Therefore it is easy to understand that for a given structure requiring thousands of units, the casting operation can take months and even years to complete a given project. Therefore it is evident that it is desirable that any shape proposed should preferably be simple to cast at a rapid rate.

The construction element includes a trapezoidal inner core supported by trapezoidal legs which space the inner core apart from any surface on which it rests, regardless of which face of the unit is disposed downward. The overall shape of the unit of the present invention is generally trapezoidal with specifically designed and shaped void segments cut into every plane surface for the release of water pressure to prevent uplift pressures from moving the units out of position. The void segments on each surface of the units also form legs for setting the units and also provides for a void area beneath the blocks for release of hydrostatic head pressure. The leg configuration also permits ease of installation on a rough stone surface. No matter how the units are arranged (patterned or random) the void zones permit escape of water pressure which is of prime importance for stability. When the units are placed pell-mell they form a highly stable mass permitting the release of water pressure in every direction even if one block is placed directly on top of another unit. When the units are set in a pattern, either laying down or standing erect, they form a stable mass and as the wave energy moves up an array of the blocks it will collide with the water jets that pass through the void area in each unit. An important aspect of the invention is the creation of high frictional contact between the units while still maintaining a channel for release of water pressure.

Of major importance in this invention is the structural integrity of the unit itself which is the prime factor in the erection of marine structures. Serious breakage problems have recently occurred on certain of the prior concrete armor shapes because of the lack of structural integrity of the units when they are subjected to eccentric movement and consolidation on a breakwater slope. In the present invention the breaking of the legs will not effect the structural integrity of the basic core of the element.

Another important object of the invention is to provide an armor shape capable of being produced with a one-piece mold.

Another object of the invention is the high degree of porosity, which exceeds 50%, even when the units are randomly placed and regardless of what position the blocks find, there is always a positive outlet for release of water pressure.

Another object of the invention is to provide lugs on the top and bottom segments of the unit for placement of the units on uneven stone surfaces with the lugs on the top of the block providing energy dissipation as water flows over the surface.

BRIEF DESCRIPTION OF THE DRAWINGS

For a better understanding of the invention, reference is made to the following drawings, to be taken in conjunction with the detailed specification to follow, in which:

FIG. 1 is a perspective view of the breakwater construction element in accordance with the present invention;

FIG. 4 is a side view of two breakwater construction elements disposed side by side;

FIG. 5 is a side view of another embodiment of the present invention; and

DESCRIPTION OF THE PREFERRED EMBODIMENT

Figure 2:
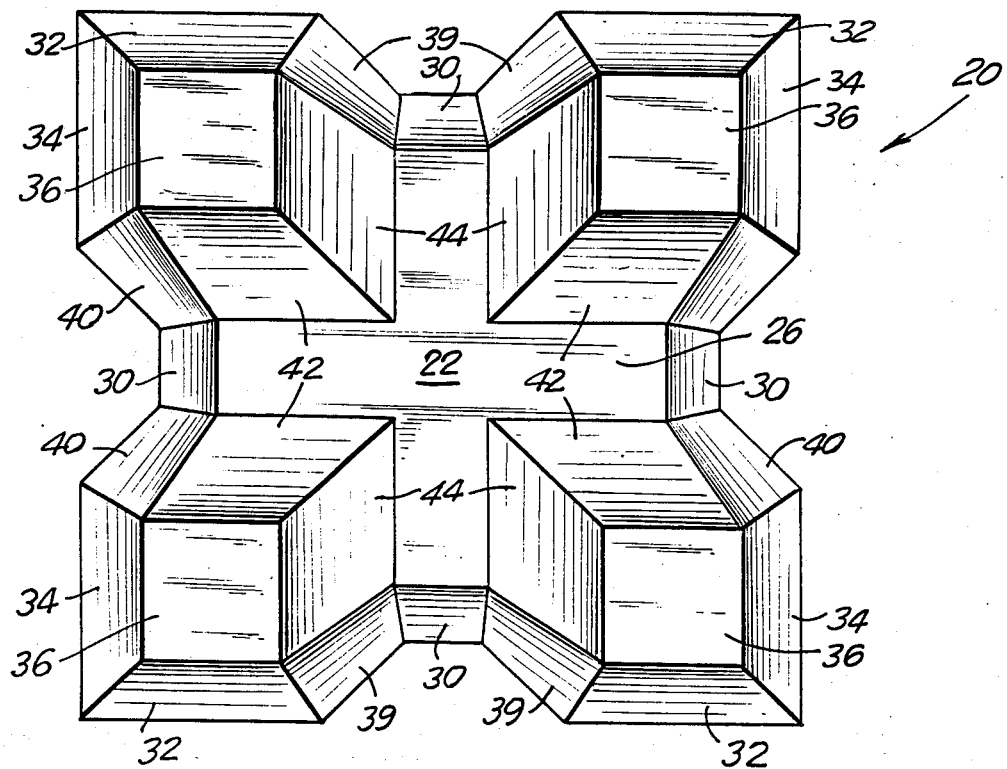
FIGS. 2 and 3 are top and bottom views respectively of the breakwater construction element of FIG. 1.

The drawings illustrate the breakwater construction element 20 in accordance with the present invention. Element 20 is comprised of an inner solid core 22 and four supports, lugs or legs 24. Inner core 22 includes an upper surface 26, a lower surface 28 and four side walls 30. Inner core 22 is square in a cross section taken parallel to the surface upon which it rests and trapezoidal in a vertical cross section with the longer base of the trapezoid disposed at lower surface 28. Element 20 is preferably cast from concrete as a single moldment as its shape facilitates one step casting. The trapezoidal configuration of the massive inner core lowers the center of gravity of element 20 which enhances its stability to thereby resist movement by water action. Should even greater mass be desired, core 22 may be filled with stone, steel shot or any other material having a greater density than concrete and such material will also increase the strength of core 22.

Extending from each of the four corners of core 22 are legs 24 which extend above upper surface 26, below lower surface 28 and beyond side walls 30 of core 22. This arrangement insures that regardless of which of the six faces that element 20 rests upon, there will always be a gap or void space provided to permit the flow of water. In order to prevent the displacement of the elements of a breakwater it is important to permit the free flow of water therethrough. As can be seen, the cross section of each leg 24 along its longitudinal axis is also trapezoidal with the longer base downward which further serves to lower the center of gravity of element 20. Finally, the overall configuration of element 20 is also trapezoidal, which further provides a low center of gravity and thus great stability.

Figure 3:
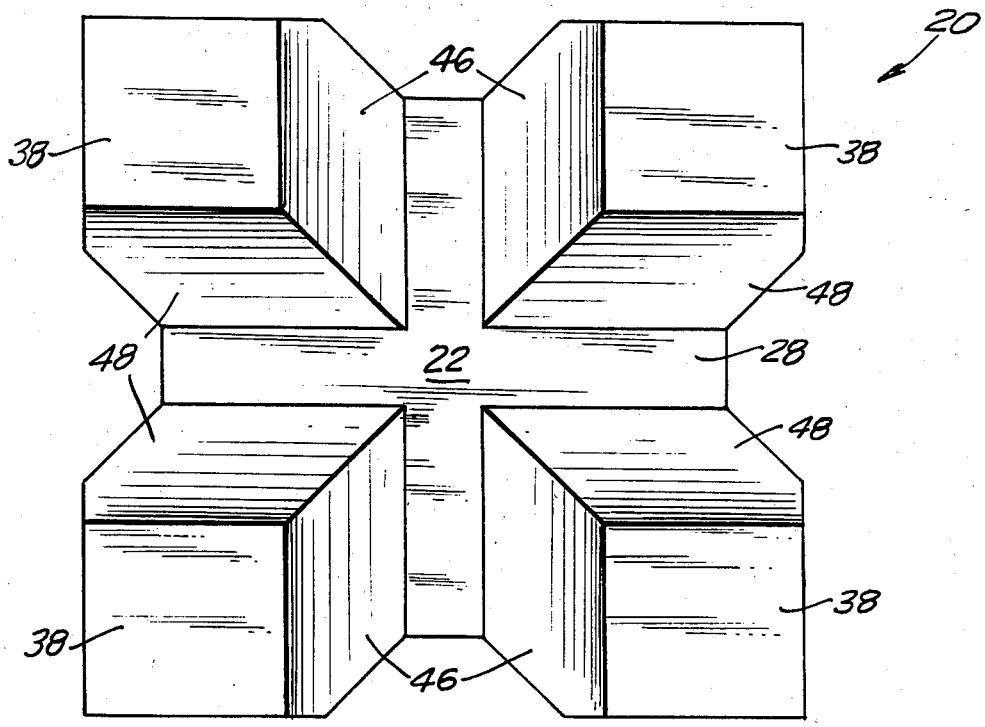

One leg 24 of element 20 will now be described in detail, and it is to be understood that the description applies equally as well to all legs 24. Each leg 24 includes outer peripheral surfaces 32, 34 which are disposed at right angles to each other as well as upper 36 and lower surfaces 38 which are flat and parallel to the upper 26 and lower 28 surfaces of core 22. Joining outer peripheral surfaces 32, 34 of leg 24 and the side walls 30 of core 22 are angled walls 38, 40. Joining upper surface 36 of leg 24 and upper surface 26 of core 22 are angled walls 42, 44. Similarly joining lower surface 38 of leg 24 and lower surface 28 of core 22 are angled walls 46, 48. As can be seen in FIGS. 2 and 3, upper surface 36 and lower surface 38 of legs 24 are square with lower surface 38 larger in area so that each leg 24 resembles a truncated pyramid.

As can be seen in FIG. 4 the tapering of legs 24 provides that the exposed portion of side wall 30 is trapezoidal in shape when viewed from the side but with the longer base of the trapezoid at the top. When two elements 20 are placed side by side with the outer peripheral walls 32, 34 touching, a tapering conical well is formed between elements 20 by walls 38, 30, and 40 which will permit stones 50 to be placed in the well to anchor elements 20 securely in place. Angled interior walls 38, 40, 42, 44, 46 and 48 serve to strengthen legs 24 against breakage since the interface between legs and core takes place over a relatively large area. The angled interior walls also serve to deflect oncoming waves thus causing turbulence and dissipation of wave energy.

FIG. 5 illustrates another embodiment of breakwater element 20 in which core 22 has a cylindrical vertical opening 52 through which a pile 54 may be driven to securely anchor element 20 in place. An array of pile secured elements 20 may be formed from alternating inverted rows of elements 20 similar to that shown in FIG. 8.

Figure 6:
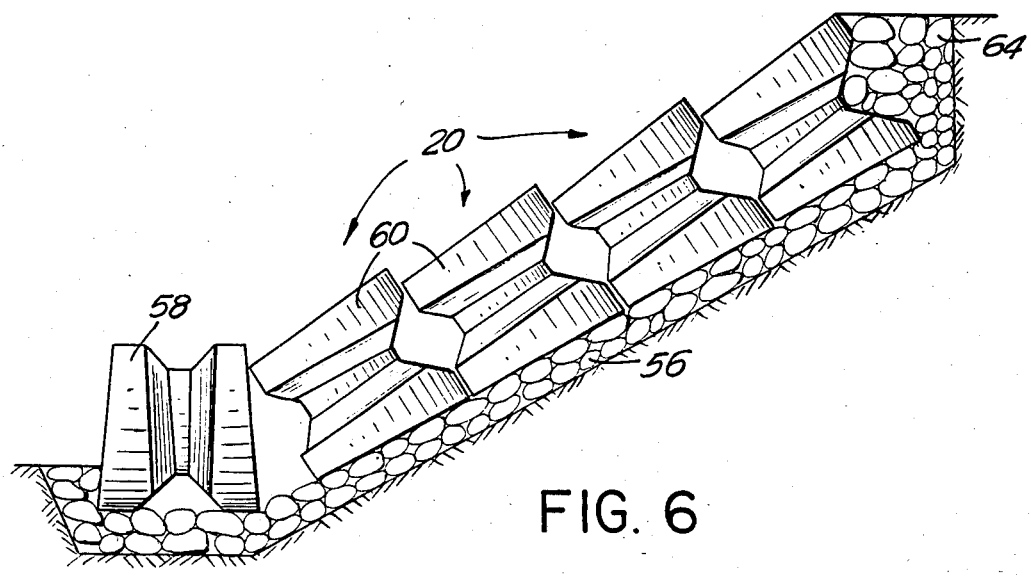
FIGS. 6 through 9 are side views of breakwaters erected wtih various arrangements of the construction elements of the present invention.
Figure 7:
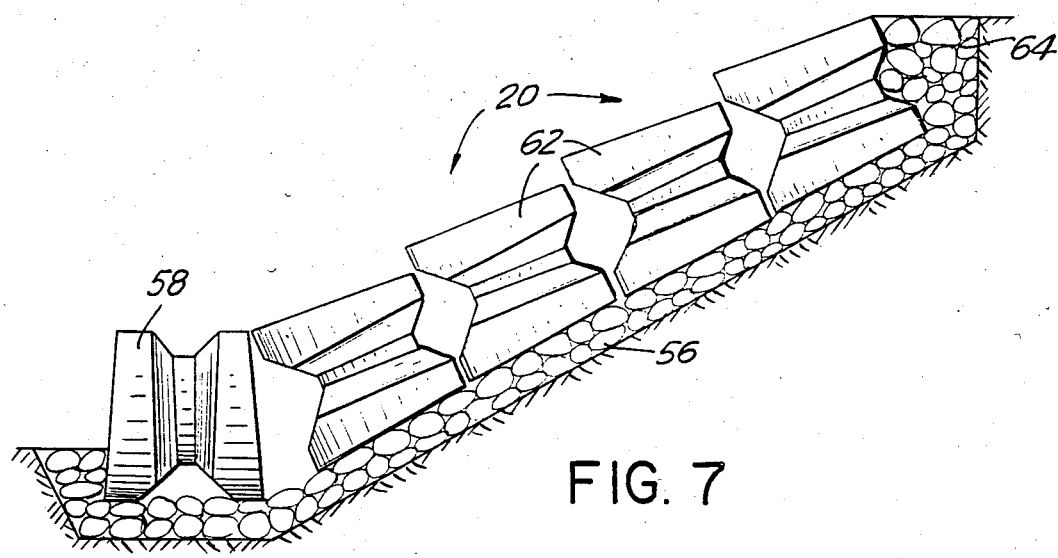

FIGS. 6 through 9 illustrate different breakwaters constructed by various arrangements of elements 20. In FIG. 6 the breakwater is placed over a stone bed 56 with a row of elements 20 disposed vertically to form a base row 58. Placed along the sloping bed 56 are rows 60 of elements 20 with the narrower upper end placed downwardly. FIG. 7 is similar to FIG. 6 except that the rows 62 of elements 20 are disposed with the wider bottom ends downwardly. In each case, additional stones 64 secured with concrete, if necessary, are used to lock the array of elements 20 in place.

Figure 8:
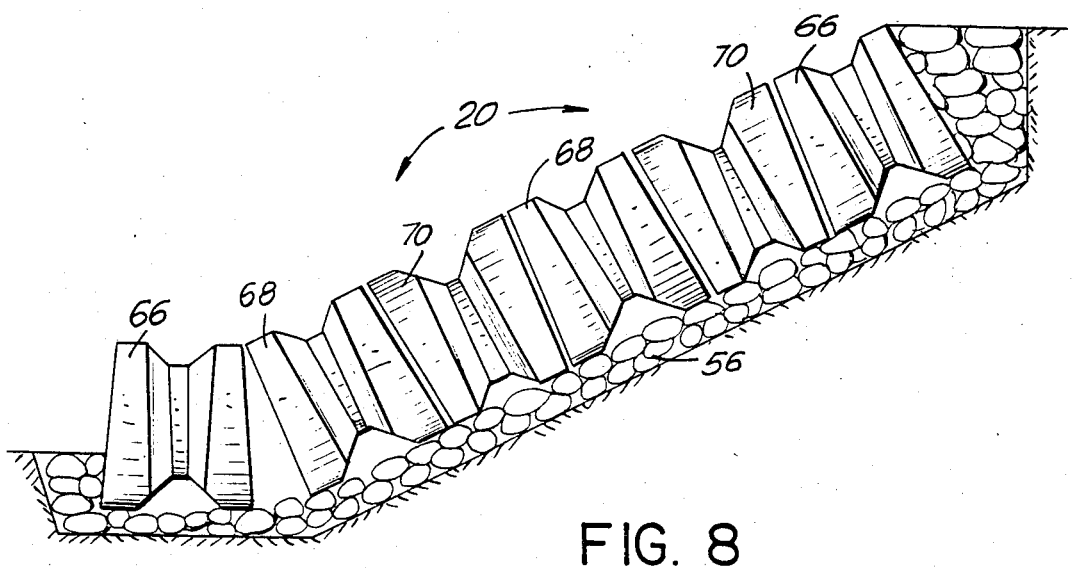
Figure 9:
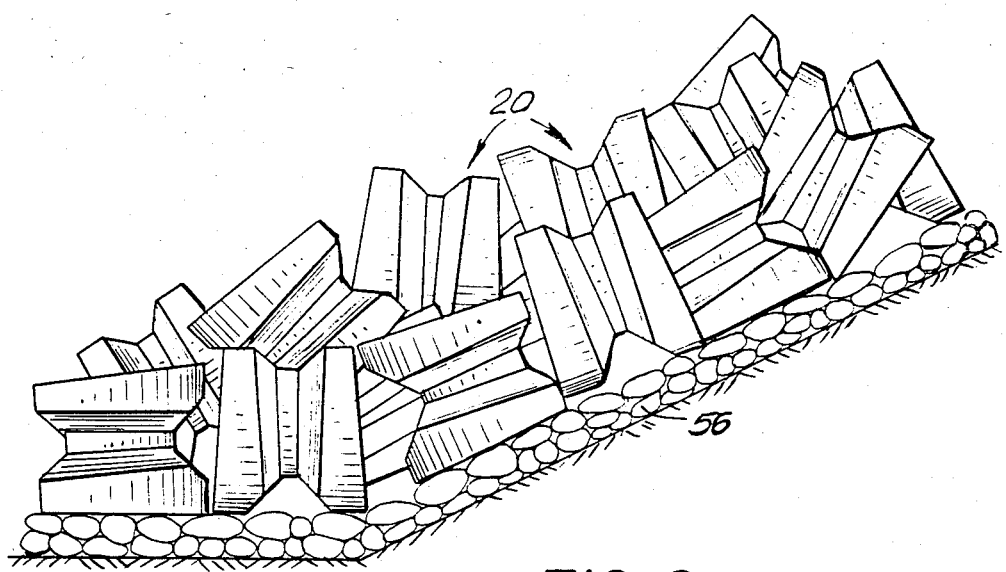

In FIG. 8 the arrangement includes a base row 66 and alternating rows of elements 68 with the wider portion downward and rows 70 with the wider portion upward which forms an interlocking array. As can be seen from the drawings the arrangement with alternating rows of inverted elements provides a wedging and interlocking action due to the trapezoidal configuration of elements 20. In FIG. 9, elements 20 are simply arranged pell mell over stone bed 56. In each arrangement it is seen that legs 24 space cores 22 apart from each other regardless of how the elements 20 are arranged. This provides a multiplicity of water channels in each array of elements 20 which insures an efficient dissipation of wave energy without dislodging the array.

The particular embodiment disclosed in detail herein and discussed above is merely illustrative of the principles of this invention. Numerous modifications and adaptations thereof will be readily apparent to those skilled in the art without departing from the spirit and scope of this invention.

What is claimed is:

1. A breakwater construction element comprising:
   (a) an inner core, said core being in the shape of a prismatic solid having an upper surface, a lower surface and four sides, the cross section of said core in a vertical plane being trapezoidal with the longer base disposed at the lower surface;
   (b) leg means extending from the corners of said inner core, said leg means extending above the upper surface, below the lower surface and beyond the periphery of said core to thereby space said core apart from any surface on which it rests regardless of which surface of the core is disposed downwardly;
   (c) said leg means being trapezoidal in vertical cross section with the longer base of the trapezoid disposed downwardly; and
   (d) said inner core and said leg means forming a construction element that is trapezoidal in overall configuration.

2. The breakwater construction element as claimed in claim 1, wherein each of said leg means includes flat upper and lower surfaces upon which said element may rest.

3. The breakwater construction element as claimed in claim 1, wherein said core and said leg means have horizontal cross sections which are square.

4. The breakwater construction element as claimed in claim 1, further including angled surfaces joining said core to said leg means.

5. The breakwater construction element as claimed in claim 1, wherein said element is formed from cast concrete.

6. The breakwater construction element as claimed in claim 5, further including material of a greater density than concrete disposed within said inner core.

7. The breakwater construction element as claimed in claim 1, wherein said core includes an opening through which a pile may be driven.

* * * * *